United States Patent
Arama et al.

(10) Patent No.: US 7,447,622 B2
(45) Date of Patent: Nov. 4, 2008

(54) FLEXIBLE NETWORK SIMULATION TOOLS AND RELATED METHODS

(75) Inventors: Roxana Arama, Seattle, WA (US); Boyd C. Multerer, Seattle, WA (US); Dinarte R. Morais, Redmond, WA (US); Mark D. Van Antwerp, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 563 days.

(21) Appl. No.: 10/404,772

(22) Filed: Apr. 1, 2003

(65) Prior Publication Data

US 2004/0199370 A1 Oct. 7, 2004

(51) Int. Cl.
G06F 9/455 (2006.01)
G06F 15/16 (2006.01)
G06F 17/00 (2006.01)
G06F 19/00 (2006.01)
A63F 9/24 (2006.01)
A63F 13/00 (2006.01)

(52) U.S. Cl. ........................... 703/23; 703/24; 709/200; 463/42

(58) Field of Classification Search .................. 703/13, 703/23–25; 709/200; 463/42
See application file for complete search history.

(56) References Cited

U.S. PATENT DOCUMENTS

| | | | |
|---|---|---|---|
| 5,838,919 A * | 11/1998 | Schwaller et al. | 709/224 |
| 5,937,165 A * | 8/1999 | Schwaller et al. | 709/224 |
| 6,012,096 A | 1/2000 | Link et al. | |
| 6,243,832 B1 * | 6/2001 | Eckes et al. | 714/33 |
| 6,314,531 B1 | 11/2001 | Kram | |
| 6,442,141 B1 * | 8/2002 | Borella et al. | 370/248 |
| 6,468,160 B2 | 10/2002 | Eliott | |
| 6,480,892 B1 | 11/2002 | Levay et al. | |
| 6,483,811 B1 | 11/2002 | Jabbarnezhad | |
| 6,712,704 B2 | 3/2004 | Eliott | |
| 6,769,989 B2 | 8/2004 | Smith et al. | |
| 6,820,042 B1 * | 11/2004 | Cohen et al. | 703/2 |
| 6,845,352 B1 * | 1/2005 | Wang | 703/24 |
| 6,853,943 B1 * | 2/2005 | Neumann et al. | 702/122 |
| 6,901,357 B1 * | 5/2005 | Patiejunas | 703/14 |
| 7,016,980 B1 * | 3/2006 | Mayer et al. | 709/249 |
| 7,024,475 B1 * | 4/2006 | Abaye et al. | 709/224 |
| 2002/0059052 A1 * | 5/2002 | Bloch et al. | 703/13 |
| 2004/0078175 A1 * | 4/2004 | Shaw et al. | 703/14 |
| 2004/0162137 A1 | 8/2004 | Eliott | |
| 2004/0240440 A1 * | 12/2004 | Wild et al. | 370/389 |

FOREIGN PATENT DOCUMENTS

JP 2002094540 A * 3/2002

OTHER PUBLICATIONS

Cronen, Eric et al. "A Distributed Multiplayer Game Server System." Univerrsity of Michigan Electrical Engineering and Computer Science Department. May 4, 2001.*

(Continued)

*Primary Examiner*—Kamini Shah
*Assistant Examiner*—David Silver
(74) *Attorney, Agent, or Firm*—Lee & Hayes, PLLC

(57) ABSTRACT

An exemplary flexible network simulator and related methods test the ability of electronic devices to communicate with each other on a network, especially in real-time. The flexible network simulator can establish different connectivity protocols between multiple electronic devices and test the electronic devices using customized sets of network conditions.

30 Claims, 11 Drawing Sheets

OTHER PUBLICATIONS

Spitzner, Lance. "Configuring Network Interface Cards." Aug. 17, 1999.*

Barnett, III, B. Lewis. "An Ethernet Performance Simulator for Undergraduate Networking." ACM 1993.*

Stratton, David. "Teaching Network Fundamentals Using a Simulated Network." SIGCSE Bulletin Jun. 1999.*

Cybernet, "Openskies Massive Multiplayer Online Game SDK" Mar. 2002.*

Kalnis, Panos et al. "An Adaptive Peer-to-Peer Network for Distributed Caching of OLAP Results." ACM 2002.*

Borella, Michael S. "Source Models of Network Game Traffic." Computer Communications vol. 23, No. 4, Feb. 2000.*

Linksys, "EtherFast Cable/DSL Firewall Router with 4-Port Switch/VP User Guide" 2004.*

GIPS IP Network Simulator, www.globalipsound.com; 2002 Global IP Sound, Inc.

Testing Network Performance with DP8Sim; http://msdn.microsoft.com/library; Feb. 27, 2003.

Garrison, William; CACI Network II.5 A Computer and Comunications Network Simulator; E.I. Monthly No. EIM8601-000599; EI Conference #05781; 1984; pp. 587-593, ISSN: 07431902.

LaPointe, et al.; "Analyzing and Simulating Network Game Traffic"; Submitted to the Faculty of the Worcester Polytechnic Institute; Dec. 19, 2001; Title page including pp. 2-106.

* cited by examiner

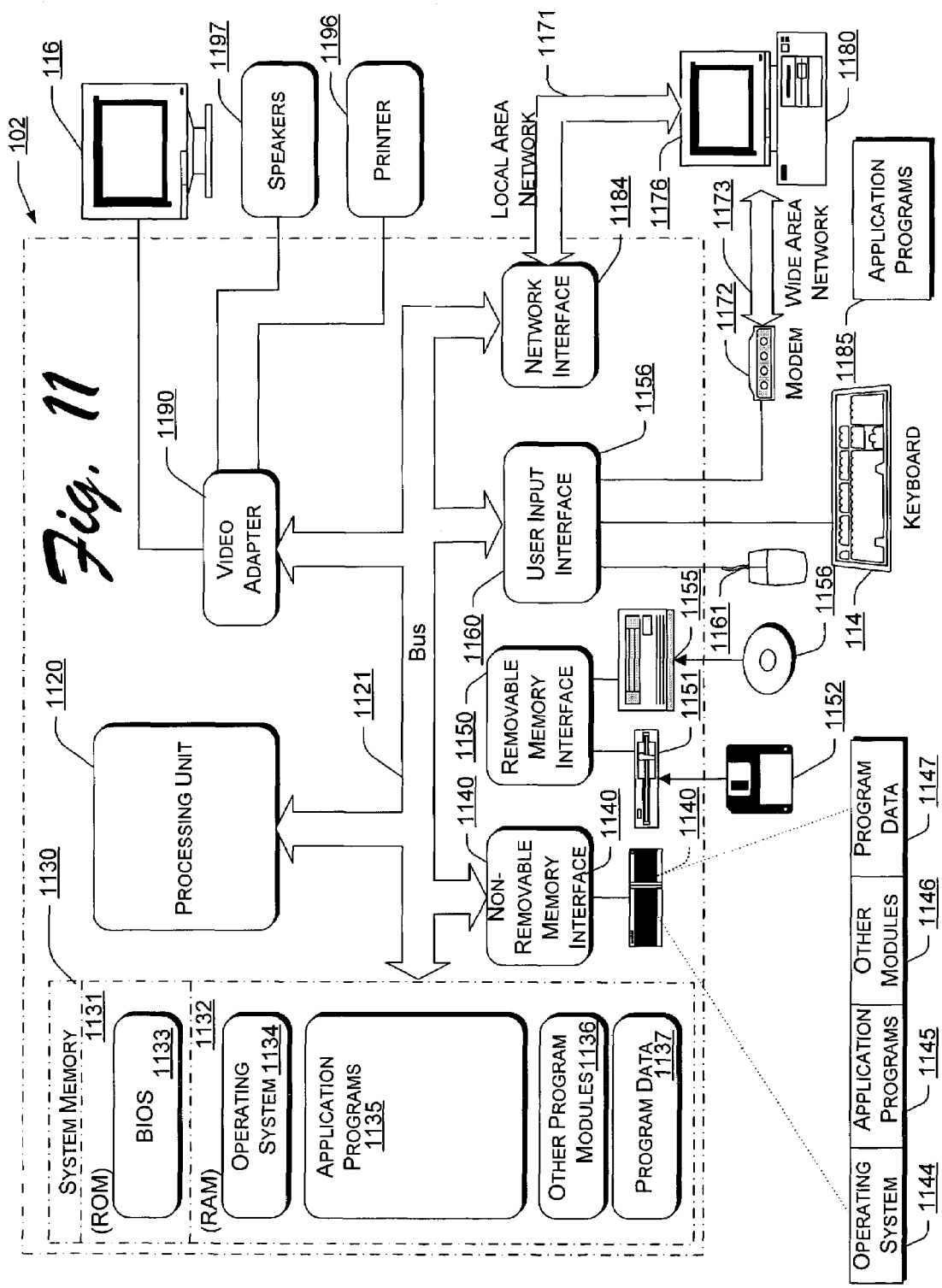

US 7,447,622 B2

FLEXIBLE NETWORK SIMULATION TOOLS AND RELATED METHODS

TECHNICAL FIELD

This invention relates generally to network connectivity and more specifically to flexible network simulation tools and related methods.

BACKGROUND

Smart devices and entertainment electronics for home and travel increasingly communicate with each other over networks. These electronic devices, which have in the past relied only on conventional communication with a server, are now becoming proficient at real-time communication with each other in unconventional ways over a myriad of networks. Sometimes a server is not needed in the peer-to-peer communications between electronic devices, and at other times one of the peers assumes the role of a server in a peer-as-server communication.

More types of home and office electronic devices are joining the ranks of consumer electronics that can communicate with each other over a network. For example, a media server in the basement of a home may record and distribute media content to other intelligent devices in the home. A user may remotely communicate with the home media server from a friend's house or from a cell phone using a wireless network to control recording of a program. Handheld devices such as cell phones and personal digital assistants (PDAs) increasingly communicate with each other in real-time over the Internet. Two PDAs with video cameras may exchange real-time video content the wireless Internet connection or, two friends in different cities may choose to watch a movie together by simultaneously viewing the movie and sharing real-time chat during the movie. Online computer games also increasingly use real-time peer-to-peer and peer-as-server interaction. Massively multiplayer (MMP) games, for example, comprise one of the fastest growing markets, with some "cult" MMP games attracting several hundred thousand simultaneous players at any given time. Many online games feature simultaneous real-time chat between players.

Many of these electronic devices that communicate with each other in real-time use diverse network connections, configurations, and protocols. These networks, however, have some undesirable characteristics. For example, wireless networks typically have a notoriously high packet loss rate. Yet developers of the hardware and software for these communicating electronic devices often use local area networks (LANs) during product development that have ideal characteristics. This is usually an unintended circumstance and happens because LANs and virtual local area networks (VLANs) available in software development labs are usually small and the finest available, i.e., stable, dependable, and free from external interferences. Further, networks that more closely resemble the real-world and real-time peer-to-peer and peer-as-server environments in which the electronic devices will eventually be used are sometimes difficult to construct in the development lab. For example, some network administrators deny server access to software and hardware under development. Thus, developers need a way to test hardware and software for the electronic devices against an almost unlimited variety of realistic network conditions and configurations without leaving the lab. Moreover, the developers may need to test completely new network conditions and types of network adversity that may arise with new products, and may need to perform the tests on a multiplicity of network architectures.

SUMMARY

Subject matter includes an exemplary flexible network simulator and related methods for testing the ability of electronic devices to perform data transfer and communications over a network, especially in real-time. The exemplary flexible network simulator can establish, on a single personal computer (PC), different connectivity protocols between multiple electronic devices and flexibly test the electronic devices with customized sets of adverse network conditions. The exemplary flexible network simulator can produce a performance profile and vary the testing based on the performance profile. The exemplary flexible network simulator can also produce information for optimizing data packet and connectivity characteristics.

BRIEF DESCRIPTION OF THE DRAWINGS

FIG. 11 is a block diagram of an exemplary computing device suitable for use with the subject matter.

DETAILED DESCRIPTION

Overview

Figure 1:
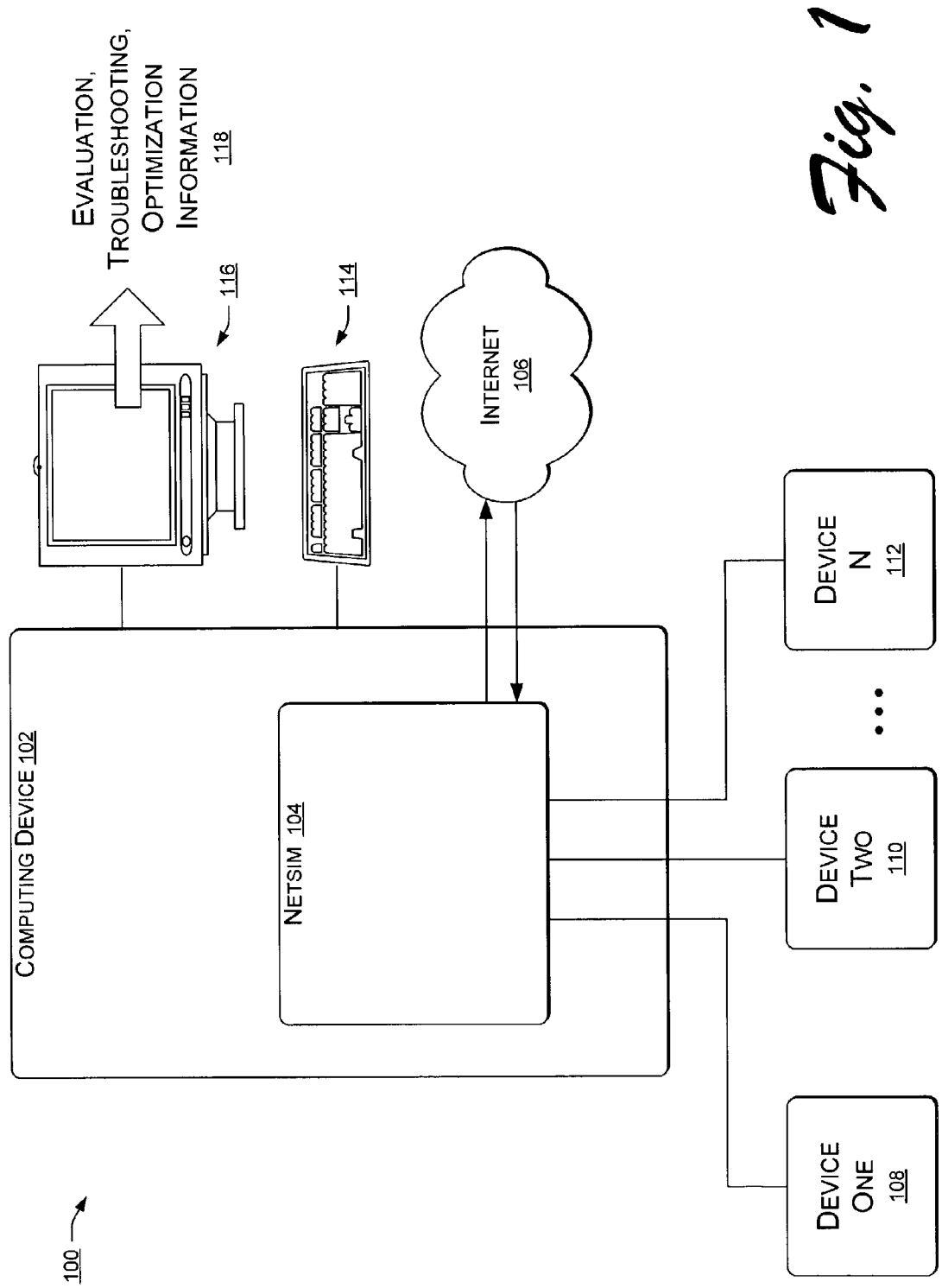
FIG. 1 is a block diagram of an exemplary computing environment in which the subject matter may be practiced.

The subject matter described herein includes an exemplary system and related methods for flexibly building realistic network connections and conditions for testing electronic devices that communicate, especially in real-time, on a network. An "electronic device" as used herein is hardware and/or software that can operate electronically and/or optically on a computing network. An exemplary flexible network simulator (NETSIM) is presented, that provides an integrated testing environment on one PC for developing network-worthy hardware and software. The exemplary NETSIM can simulate many different connectivity configurations and conditions, e.g., using different protocols, modem characteristics, and topographies, such as peer-to-peer and peer-as-server. The exemplary NETSIM can apply a wide variety of simulations and/or tests that simulate realistically adverse network conditions likely to be encountered in real-world use. The exemplary NETSIM gathers numerous simulation tools, optimizers, and reporting entities (collectively, "filters") together in one entity and allows the developer to combine simulations using these filters into unique test profiles featuring customized test sequences, filter combinations, and individualized performance results.

In one implementation, the exemplary NETSIM establishes gateways between electronic devices and sometimes between these electronic devices and their Internet services. In one implementation, the gateways use network address translation (NAT). The exemplary NETSIM can be tuned, using built-in adapters, to specific connectivity protocols that provide an adaptable testing environment that also includes universal benchmarks. The benchmarks afford confidence and assurance to a developer whose product meets standards set by the benchmarks. The various filters are modular and can be sequenced, combined, and rearranged into various filter profiles. The filters can also be swapped in and out, augmented, updated, and/or replaced with newer and/or different filters.

Exemplary NETSIM filters can introduce various combinations of upstream and downstream packet loss, latency, bandwidth limitation, packet reordering, and jitter, etc. to simulate the modem limitations, network pitfalls, and traffic volume between devices, e.g., in peer-to-per and peer-as-server environments. This aids the developer by pointing out early in the development process that the software and/or hardware design relies, for example, on sending too much data. Further, the exemplary NETSIM can allow the developer to test control paths, which are prone to problems such as high lag, loss of synchronization, and high packet loss. The exemplary NETSIM can also apply progressive testing, using feedback to simulate ever more challenging network environments. The exemplary NETSIM can also optimize data packet parameters and can present the developer with reports, such as network performance and strength-and-weakness profiles for the product under development.

Exemplary Computing Environment

FIG. 1 shows an exemplary computing environment 100 in which the subject matter may be practiced. A computing device 102 includes an exemplary NETSIM 104, which in turn is communicatively coupled with the Internet 106, and with electronic devices, such as electronic device "one" 108, electronic device "two" 110, . . . and electronic device "N" 112. The electronic devices 108, 110, 112 may communicate with each other as peers, or one of the devices 108, 110, 112 may assume the role of a server in peer-as-server communication with the others. The peer-to-peer and peer-as-server communications do not necessarily preclude communication at the same time with other servers and services. The computing device 102 is also coupled with various user-interface devices, such as a keyboard 114 and a monitor 116 for visual display of information 118 regarding the evaluation, troubleshooting, and optimization. The exemplary computing device 102 is illustrated and described in greater detail in FIG. 11.

A software or hardware developer creating an electronic product that communicates over a network with other electronic devices, especially in real-time, wants the product to run smoothly and operate correctly. The exemplary computing environment 100 can be adopted by the developer as a way to couple one or more electronic devices 108, 110, 112 for testing and troubleshooting their networking performance.

The exemplary NETSIM 104, therefore, establishes custom connectivity between the coupled electronic devices 108, 110, 112 and controls communication and interaction between them. The exemplary NETSIM 104 also serves as the default gateway between the electronic devices 108, 110, 112 and the Internet 106. The electronic devices 108, 110, 112 send packets to the exemplary NETSIM 104 at its internal IP address. In one implementation, the exemplary NETSIM 104 has two modes, one mode allowing "normal" network interaction between the electronic devices 108, 110, 112 and the other mode allowing the simulation of network adversity.

Network adversity is a term used herein to describe problems, conditions, and limitations of real-world networks, modems, topologies, protocols, etc. and their configurations. The exemplary NETSIM 104 can present or inject network adversity into the interaction between the electronic devices 108, 110, 112 and/or their Internet service(s) in measured amounts to suit the present stage of development and network-worthiness of the software and/or hardware being developed. The exemplary NETSIM 104 has the capacity to automatically progress from light testing to rigorous testing (i.e., "progressive testing") as the software and/or hardware under development overcomes network adversity challenges. Thus, the NETSIM 104 can be switched from the aforementioned normal mode—in which an ideal network having little or no network adversity is presented to the coupled electronic devices 108, 110, 112—to a simulation mode, in which a powerful and comprehensive set of filters are flexibly brought to bear on the problem of determining and establishing network-worthiness for software and/or hardware under development.

Overview of the Exemplary NETSIM

Figure 2:
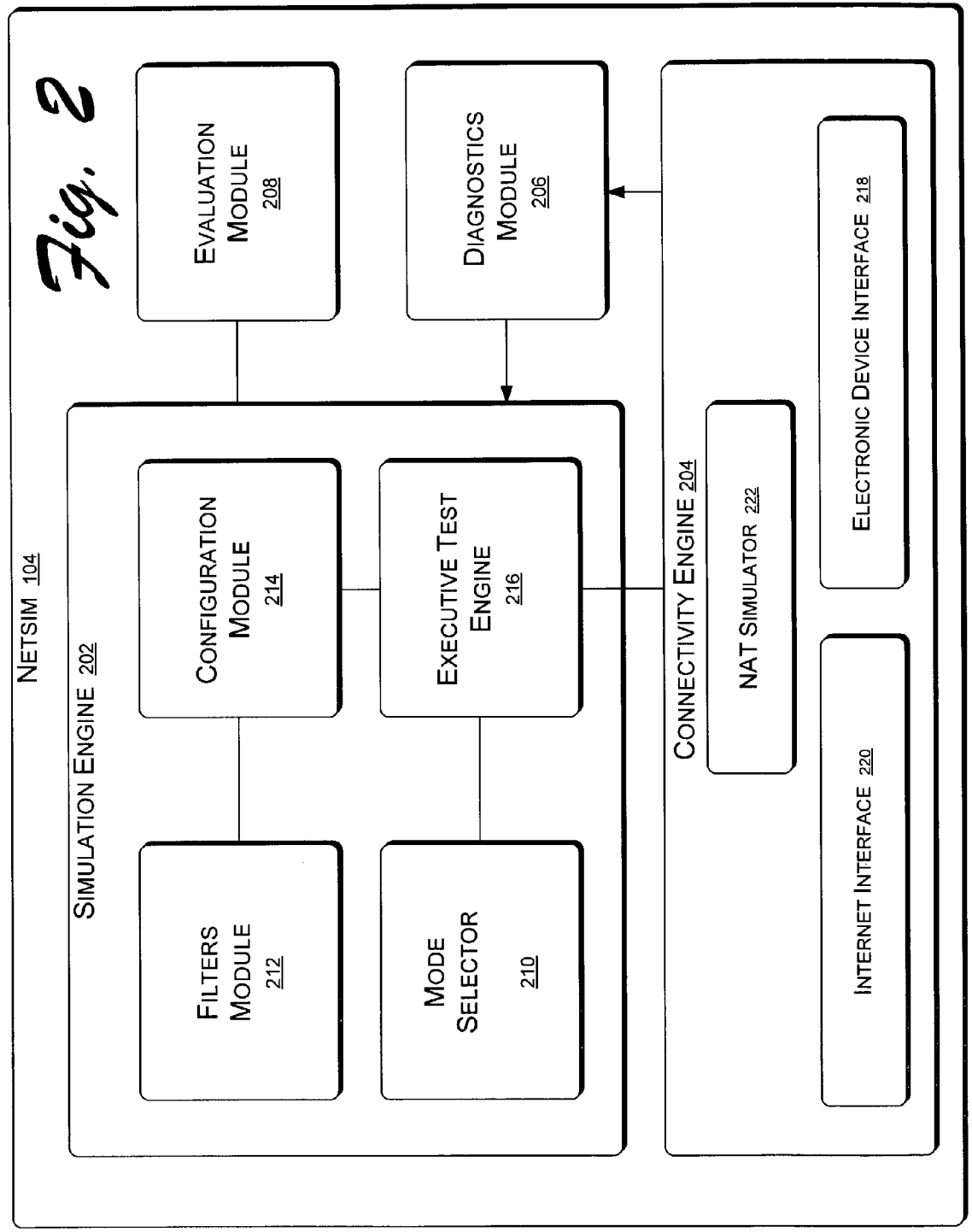
FIG. 2 is a block diagram of an exemplary flexible network simulator.

Accordingly, FIG. 2 shows the exemplary NETSIM 104 of FIG. 1 in greater detail. A simulation engine 202 and a connectivity engine 204 are communicatively coupled with each other and communicatively coupled with a diagnostics module 206 and an evaluation module 208 as illustrated. The simulation engine 202 includes a mode selector 210 to administer, in one implementation, the aforementioned normal mode and simulation mode. The simulation engine 202 further includes a filters module 212, a configuration module 214, and an executive test engine 216.

The connectivity engine 204 further includes an electronic device interface 218, an Internet interface 220, a network address translation (NAT) simulator 222, and other components to be discussed more fully below with regard to FIG. 6.

In the simulation engine 202, the filters module 212 includes or comprises a set of filters, each of which aims to provide a discrete network test or condition. The size of the set of filters is variable so that new filters may be added to the set or substituted for filters to be updated or replaced. The filters module 212 will be discussed in greater detail below with respect to FIG. 3.

The configuration module 214 selects or allows the developer to select filters (and their combination and potential sequence of operation) from the filters module 212. In one implementation, the configuration module 214 selects an upstream and downstream set of filters for each IP address, that is, each electronic device 108, 110, 112 attached to the exemplary NETSIM 104 for testing. Each electronic device 108, 110, 112 participates in a downstream data flow from a service or peer to itself and an upstream data flow from itself to the service or peer. The upstream and downstream data traffic is typically constricted by a modem, such as a broadband modem, which typically favors downstream data flow to the electronic device 108, 110, 112 over upstream data flow from the electronic device 108, 100, 112. Individualized configuration and deployment of filters ("filter profiles") can be selected for each of the upstream and downstream packet flows for a given electronic device 108, 110, 112. These filter profiles are sent or made available to the executive test engine 216 to guide (or be carried out in) actual tests.

The diagnostics module 206 measures the network performance of one or more electronic devices 108, 110, 112 and provides feedback to the simulation engine 202 (especially the executive test engine 216 component) and to the evaluation module 208 (for display of performance to the developer). The diagnostics module 206 and the evaluation module 208 will be discussed more fully below with respect to FIGS. 7 and 8.

The illustrated configuration of the exemplary NETSIM 104 is only one example implementation. Other exemplary implementations are possible. It is worth noting again that in one implementation the overall design of the exemplary NETSIM 104 is modular so that the various engines and modules can be added to, swapped in and out, updated and replaced, etc.

Exemplary Filters Module

Figure 3:
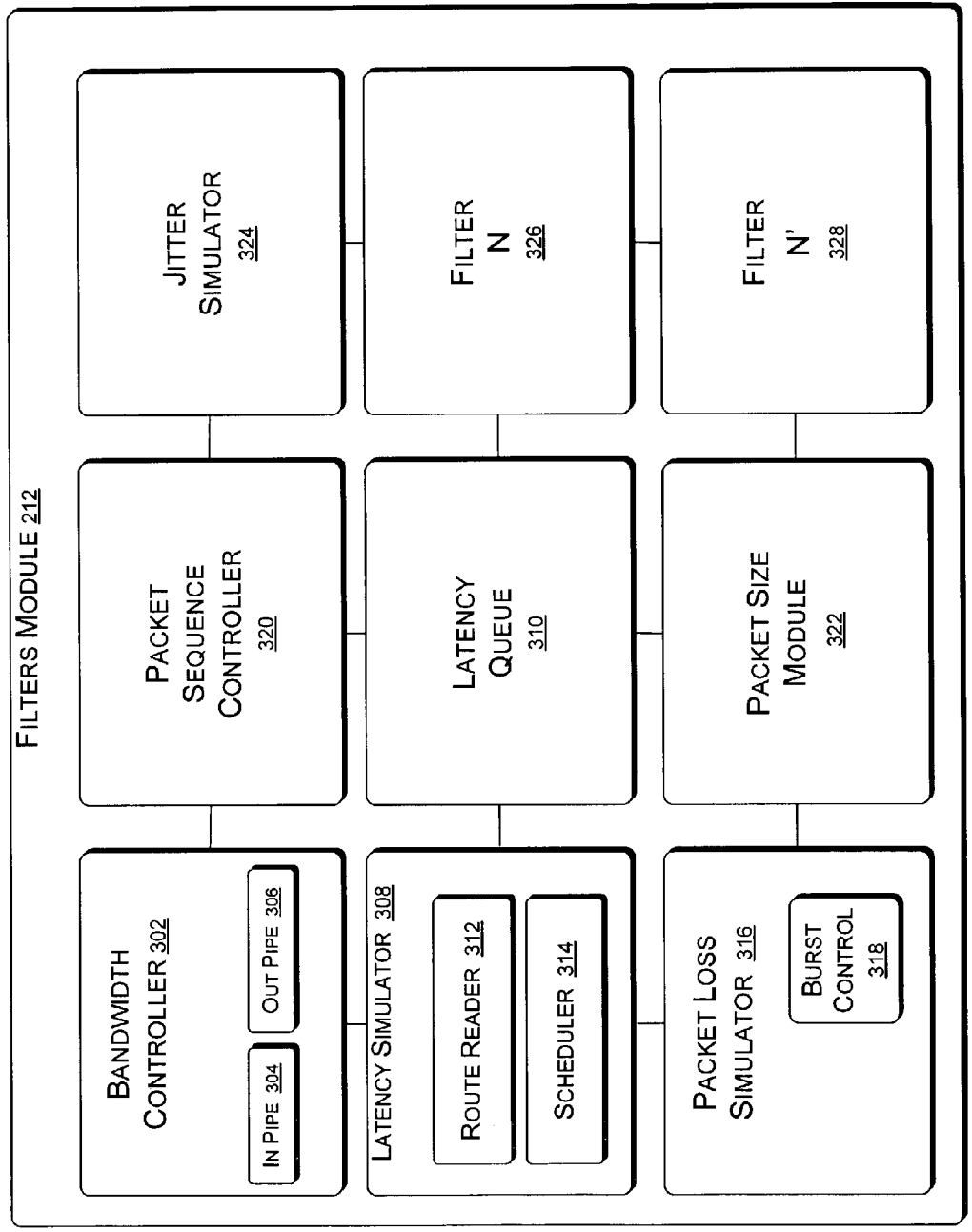
FIG. 3 is a block diagram of exemplary filters for the exemplary flexible network simulator.

As shown in FIG. 3, the modularity of the exemplary NETSIM 202 is evident in the filters module 212. In one implementation, the filters module 212 includes a variable set of replaceable single filter modules that can be selected, sequenced, and combined to provide nearly unlimited flexibility in creating filter profiles for tests. Each filter can be hardware, software, or a combination of both. Some filters perform a network condition simulation or control a network parameter.

An electronic device 108, 110, 112 may have directional traffic flow when connection to a network through a modem that allows fast downloading but relatively slow uploading. In such a case, it is usually desirable to have the electronic device 108, 110, 112 on the highest upstream bandwidth connection available. A bandwidth controller 302 is a filter that includes a system of packet transmission conduits, that is, at least one "in pipe" 304 to control downstream packet traffic from an electronic device 108, 110, 112 and at least one "out pipe" 306 to control upstream packet traffic to an electronic device 108, 110, 112. In a typical filter profile, an instance of the bandwidth controller 302 can be selected for each connected electronic device 108, 110, 112, or alternatively, can be used globally to establish a downstream bandwidth via the in pipe 304 and an upstream bandwidth via the out pipe 306 for all coupled devices at once. The bandwidth controller 302 typically creates bottlenecks to traffic flow to suit or simulate these upstream and downstream differences, so that data traffic to and from an electronic device 108, 110, 112 is constricted in a useful manner for realistic simulation. This allows evaluation of software and/or hardware performance during periods of limited bandwidth, a frequently-occurring condition, for example, in live, online gaming environments.

A latency simulator 308 is a filter that can be communicatively coupled with a latency queue 310. The latency simulator 308 may include a packet route reader 312 and a packet scheduler 314. The latency simulator 308 emulates delays in packet delivery due to Internet complexities such as repeated routing, heavy traffic, and timeouts. In one implementation, the route reader 312 can obtain packet origin and source information from packet headers and send the information to the scheduler 314, which uses this information to control the timing and delay of packet delivery. The latency queue 310 can be a heap of packets ordered by their release time. The delay in packets to be sent from a source IP address to a destination IP address via the latency queue 310 is typically measured in milliseconds, with a nominal maximum delay of one second. Testing with key-exchange delays may have a nominal maximum delay in the range of five to six seconds.

A packet loss simulator 316 is a filter for dropping a percentage of the packet traffic between a source IP address and a destination IP address at a drop rate setting. The packet loss simulator 316 may also simulate packet expiration and/or packet loss due to low bandwidth, for example.

A burst control 318 included in the packet loss simulator 316 allows the exemplary NETSIM 104 to drop a certain percentage of packets in a given amount of time. When the burst control 318 is deployed it overrides the current drop rate setting of the packet loss simulator 316. In one implementation, five parameters can be set for the burst control 318: the burst drop rate, the burst duration, the delay from the beginning of a simulation to a first burst, the total number of bursts to be performed during the test, and the interval between each burst. In an example scenario, the settings of the burst control 318 for packets entering IP address 10.0.0.2 might be a burst drop rate of 10%, a burst duration of ten seconds, a delay of fifteen seconds from the beginning of the simulation until the first burst, a burst count of ten, and an interval between bursts of thirty seconds. In this example scenario, if the packet loss simulator 316 has a drop rate setting of 2%, then fifteen seconds after the simulation begins the 2% drop rate setting changes to a 10% drop rate for ten seconds. This 10% drop rate then changes back to a 2% drop rate for thirty seconds before changing back to a 10% drop rate. This cycle would repeat ten times. Of course, these example parameters may be varied greatly. The burst control 318 is to be distinguished from the exemplary jitter simulator 324, which is a filter that holds a number of packets and sends them altogether, simulating a common occurrence on the real-world Internet 106.

A packet sequence controller 320 is a filter that can reorder packets to simulate out-of-order packets due to disparate Internet routing. In real-world Internet traffic, packets can arrive in any order after following different routes to their destination, and are typically reordered at the destination according to packet header information. The packet sequence controller 320 tests the ability of software and/or hardware under development to reorder packets and/or tolerate the effects of a network stack that is extending resources to reorder packets. In one implementation, the packet sequence controller 320 is set to switch the order of two packets at repeating selected intervals.

In some implementations, a packet size module 322 may be able to simulate and/or specify various IP data packet or datagram sizes. This facilitates optimization of data flow, to be discussed more fully below with respect to FIG. 8.

Additional filters 326, 328 can be plugged into the filters module 212, as previously mentioned. Each filter in the filters module 212 can be swapped out, updated, or replaced with a different filter without disturbing the performance or efficacy of other filters. Thus, the filters module 212 is a library of filters that can be selected, sequenced, and combined for upstream and downstream filter profiles.

Exemplary Configuration Module

Figure 4:
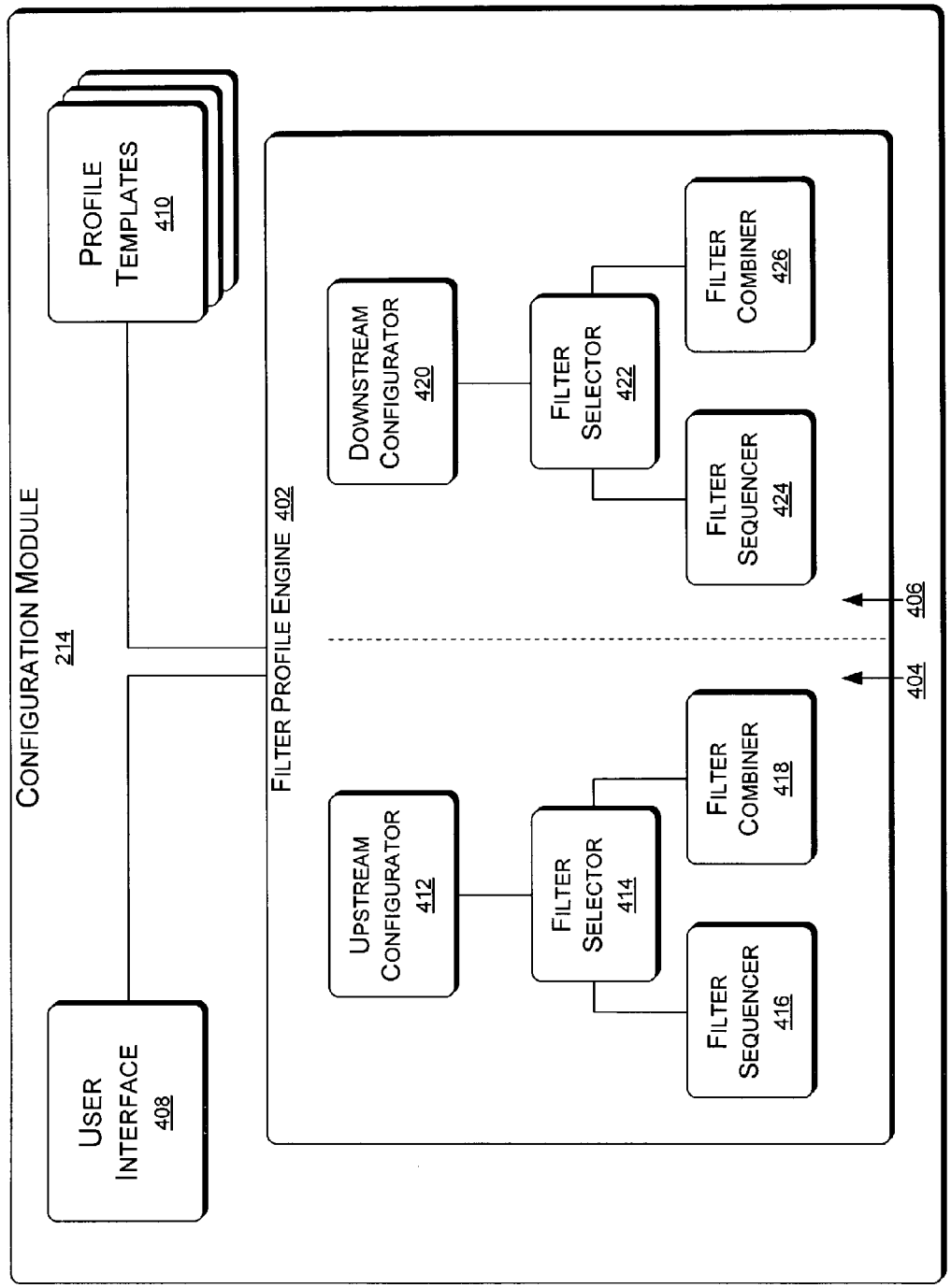
FIG. 4 is a block diagram of an exemplary configuration module, according to one aspect of the subject matter.

FIG. 4 shows the configuration module 214 of FIG. 2 in greater detail. The configuration module 214 may contain a filter profile engine 402 that includes an upstream side 404 and a downstream side 406. With guidance from a user via a user interface 408 and/or guidance from a library of profile templates 410, the filter profile engine 402 creates filter profiles to be implemented by the executive test engine 216. Alternatively, the filter profile engine 402 may also use feedback from the diagnostics module 206 and the executive test engine 216 to create one or more filter profiles.

On the upstream side 404, an upstream configurator 412 employs a filter selector 414 to choose which filters from the filters module 212 will be used in a particular upstream filter profile. Once the filters are selected, a filter sequencer 416 may be employed to determine the order in which each filter performs a simulation. A filter combiner 418 can also be used to determine if any filters are to be applied simultaneously.

On the downstream side 406, a downstream configurator 420, a filter selector 422, a filter sequencer 424, and a filter combiner 426 are communicatively coupled as illustrated and perform similar functions as corresponding counterparts on the upstream side 404.

Exemplary Executive Test Engine

Figure 5:
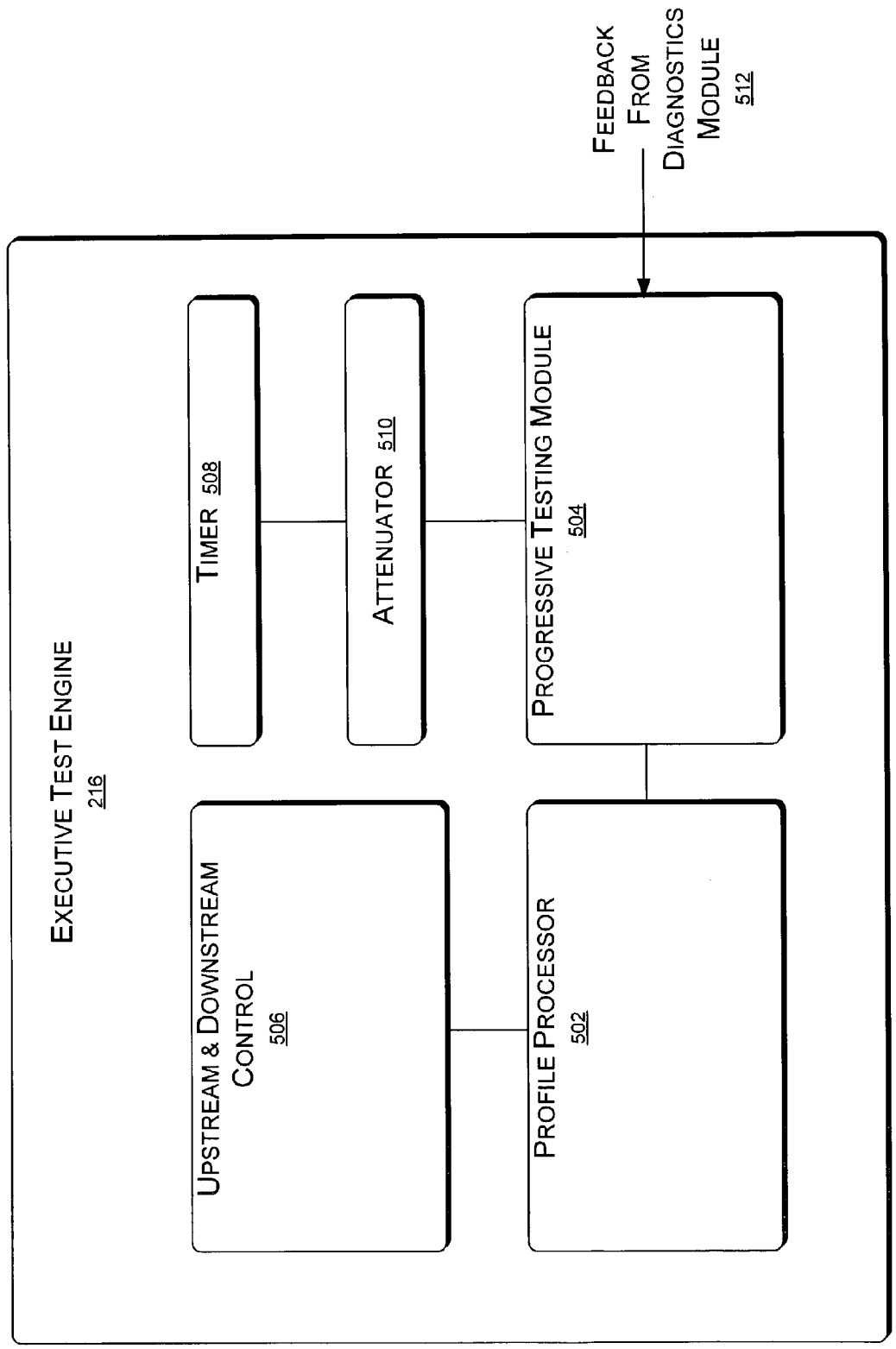
FIG. 5 is a block diagram on an exemplary executive test engine, according to one aspect of the subject matter.

FIG. 5 shows the executive test engine 216 of FIG. 2 in greater detail. A profile processor 502, a progressive testing module 504, an upstream and downstream test controller 506, a timer 508, and an attenuator 510 are communicatively coupled as illustrated. The profile processor 502 is the basic engine in the executive test engine 216 for implementing filter profiles. It should be noted that the executive test engine 216 works through the connectivity engine 204 to implement many of the network condition simulations.

In one implementation, the upstream and downstream test controller 502 feeds the upstream and downstream filter profiles created by the configuration module 214 to the profile processor 502. The upstream and downstream test controller 506 may augment the profile processor 502 by acting as a coprocessor to keep the upstream and downstream profiles delineated from each other, or in other words, to direct the profile processor 502 to perform a network condition simulation on the upstream side of an electronic device, on the downstream side of an electronic device, or on both.

In conjunction with the profile processor 502, the progressive testing module 504 uses feedback, for example from the diagnostics module 512, to vary the intensity and duration of network adversity presented to electronic devices 108, 110, 112. In one implementation, the progressive testing module 504 proceeds logically from easy testing, in which the network adversity presented by a filter is light, to rigorous testing, in which the network adversity presented by a filter is difficult. Each filter usually has parameters that can be varied to provide a spectrum of light to difficult network adversity during the simulation period. For example, a drop rate setting for the packet loss simulator 316 can begin at 2% and progress to 20%. Packet bursts managed by burst control 318 can increase in frequency and duration. Bottlenecks provided by the bandwidth controller 302 can become more restrictive as an electronic device 108, 110, 112 succeeds in handling increasingly difficult performance levels. The progressive testing module 504 may also alter and/or vary the progression, sequence, and combination of filters in a filter profile being used for testing, depending on performance feedback. For example, if an electronic device 108, 110, 112 fails a lightweight packet drop test, then the progressive testing module 504 might skip burst and jitter simulations. If the electronic device 108, 110, 112 performs well during a packet dropping simulation, however, the progressive testing module 504 might continue the packet dropping simulation and add a packet reordering "test" or simulation on top of it. The progressive testing module 504 has access to the timer 508 as a reference for measuring performance and for measuring the duration of a progressive simulation being applied. The progressive testing module 504 also has access to the attenuator 510, which includes damping algorithms and/or circuits to taper the intensity and duration of a simulation.

Exemplary Connectivity Engine

Figure 6:
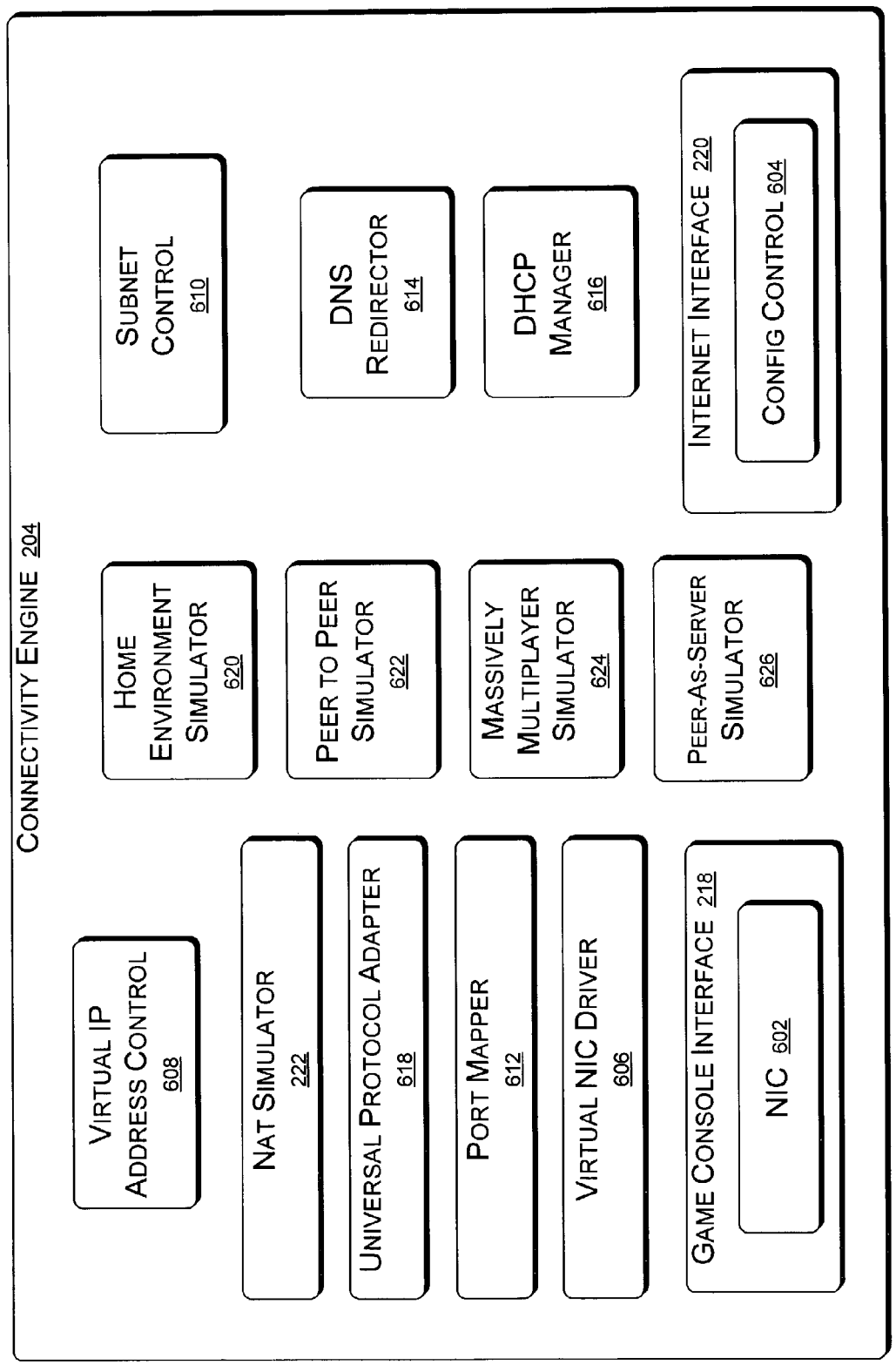
FIG. 6 is a block diagram of an exemplary connectivity engine, according to one aspect of the subject matter.

FIG. 6 shows the connectivity engine 204 of FIG. 2 in greater detail. The connectivity engine 204 may use commonly available network stack configurations, or alternatively, may use a proprietary network stack tuned to a particular platform, such as a proprietary online gaming platform.

Regarding the components previously illustrated in FIG. 2, the electronic device interface 218 includes at least one network interface card (NIC) 602 and the Internet interface 220 may include a configuration controller 604. The connectivity engine 204 establishes itself as the default gateway between electronic devices 108, 110, 112 and the Internet 106. The electronic devices 108, 110, 112 send packets to the connectivity engine 204 at its internal IP address, and the connectivity engine 204 passes the packets on to the Internet 106 through an external IP address. In the simulation mode, however, the connectivity engine 204 may pass the packets to the simulation engine 202 before the packets are sent to the Internet 106.

The connectivity engine 204 may also include a virtual NIC driver 606. In one implementation, the NIC driver 606 simulates multiple virtual NICs, each having its own IP address. In this way, the NETSIM 104 requires only one physical network adapter in the electronic device interface 218. In another implementation, the electronic device interface 218 uses two or more physical NICs if a virtual NIC driver 606 is not used.

Using a NAT implementation, the connectivity engine 204, either through the virtual NIC driver 606, a virtual IP address controller 608, or both, can handle multiple internal IP addresses. In one implementation, the connectivity engine 204 separates individual electronic devices 108, 110, 112 by placing them on separate subnets, via a discrete subnet control module 610. The separation onto individual subnets allows the exemplary NETSIM 104 to route packets through its own simulation engine 202 rather than routing packets directly between electronic devices 108, 110, 112. Because the exemplary NETSIM 104 handles all packets between electronic devices 108, 110, 112, it has the opportunity to change network conditions between them, i.e., simulate network adversity. The exemplary NETSIM 104 also has the opportunity to change network conditions between electronic devices 108, 110, 112 and the rest of the Internet 106.

The NAT simulator 222 can emulate the common scenario of an electronic device 108, 110, 112 connected to the Internet 106 through a home NAT device that allows another personal computer to use the Internet 106 through the same Internet Service Provider (ISP) connection. The NAT simulator 222 can also simulate multiple peers with different home NAT configurations talking to each other. Current NAT types have different filtering for taking into account IP addresses and/or ports. The NAT simulator 222 in conjunction with the port mapper 612 and other connectivity engine 204 components, can simulate different NAT types for behind-the-NAT connectivity testing. This saves time for software and/or hardware developers. In one implementation, the NAT simulator 222 defaults to a "type 2" NAT. The NAT simulator 222 can also accommodate electronic devices 108, 110, 112 with NAT capability supporting only Internet Protocol version 4 (IPv4) and not IPv6.

A domain name service (DNS) redirector 614 offers the feature of directing among different online service instances. The DNS redirector 614 enables software under development to be tested on multiple environments with different sets of data.

The number of electronic devices 108, 110, 112 that can be supported by the connectivity engine 204 is not limited, unless the particular type of electronic device 108, 110, 112 has a built-in limited IP address range. With electronic devices 108, 110, 112 having an exemplary built-in IP address range from 10.0.0.2 to 10.0.255.2, the connectivity engine 204 could handle 256 electronic devices 108, 110, 112 since each electronic device 108, 110, 112 has a unique IP address in the range. Each electronic device 108, 110, 112 could have a gateway and primary DNS configured to 10.0.X.1, and each could have a subnet mask configured to 255.255.255.0, which in this implementation could achieve the desired result of sending all packets through the connectivity engine 204 instead of directly to another electronic device 108, 110, 112.

In one implementation, NAT settings are configured for the connectivity engine 204. Via the virtual IP address controller 608, the range of virtual IP addresses available to electronic devices 108, 110, 112 can be adjusted. If an IP address range such as 10.0.X.1 is adopted, where X is between 0 and 255 inclusive, then if two instances of the exemplary NETSIM 104 are operative on the same subnet, the first instance can lock out the other instance.

The external network settings for the exemplary NETSIM 104 can be either dynamic or static. By default, a DHCP manager 616 and/or the configuration controller 604 try to configure the Internet interface 220 via DHCP, and may hand out different IP addresses to various electronic devices 108, 110, 112 to facilitate connectivity and network simulation.

A universal protocol adapter 618 may accommodate a variety of protocols, that is, each virtual IP address (each electronic device 108, 110, 112) on the NIC 606 may have a different protocol associated. The interface established between a particular IP address of a virtual NIC and a host computing device, such as the exemplary computing device 102, may accommodate a variety of "tunnels." The protocol adapter 618 may allow connection of electronic devices 108, 110, 112 each using a different protocol such as various framing schemes, TCP/IP, Point-to-Point Protocol over Ethernet (PPPoE), etc.

In conjunction with the universal protocol adapter 618, a home environment simulator 620, a peer-to-peer simulator 622, a massively multiplayer (MMP) simulator 624, and a peer-as-server simulator 626 can simulate their namesake network environments. The home environment simulator 620 can set-up and coordinate various home NAT configurations for behind-the-NAT simulation, as mentioned above.

The peer-to-peer simulator 622 can emulate typical connectivity between electronic devices 108, 110, 112, and likewise between each of the electronic devices 108, 110, 112 and an Internet service. The peer-to-peer simulator 622 can, in one example implementation, mimic circumstances wherein the electronic device 108, 110, 112 is a gaming console that "cheats" by terminating its connection with a peer while maintaining a connection to the Internet service. In a multiplayer game, a clever user may break connections to peers but not to the Internet service to appear "honest" and connected from the Internet service's point of view, while having the game voided because peers are not reporting the same score. The peer-to-peer simulator 622 thus allows simulation of connectivity between peers and Internet services and can test the effects of timeouts between peers and Internet services.

The massively multiplayer (MMP) simulator 624 can simulate a multiplayer game or other collection of electronic devices 108, 110, 112 having thousands, tens of thousands, and hundreds of thousands of simultaneous gamers or users. This may be accomplished by the MMP simulator 624 implementing a filter profile that mimics traffic and connectivity measured previously during a real-world MMP gaming session.

The peer-as-server simulator 626 can simulate an increasingly popular connectivity scheme, used increasingly in applications such as online gaming, in which one of the peers assumes the role of server. A peer-as-server configuration is typically harder to test than peer-to-peer setups. The peer-as-server simulator 626 can accommodate peer-as-server configurations, for example, by allotting an asymmetric filter profile for one peer electronic device 108, 110, 112 that sets this peer apart from the others and imparts to the peer data flows characteristic of a server.

Exemplary Diagnostics Module

Figure 7:
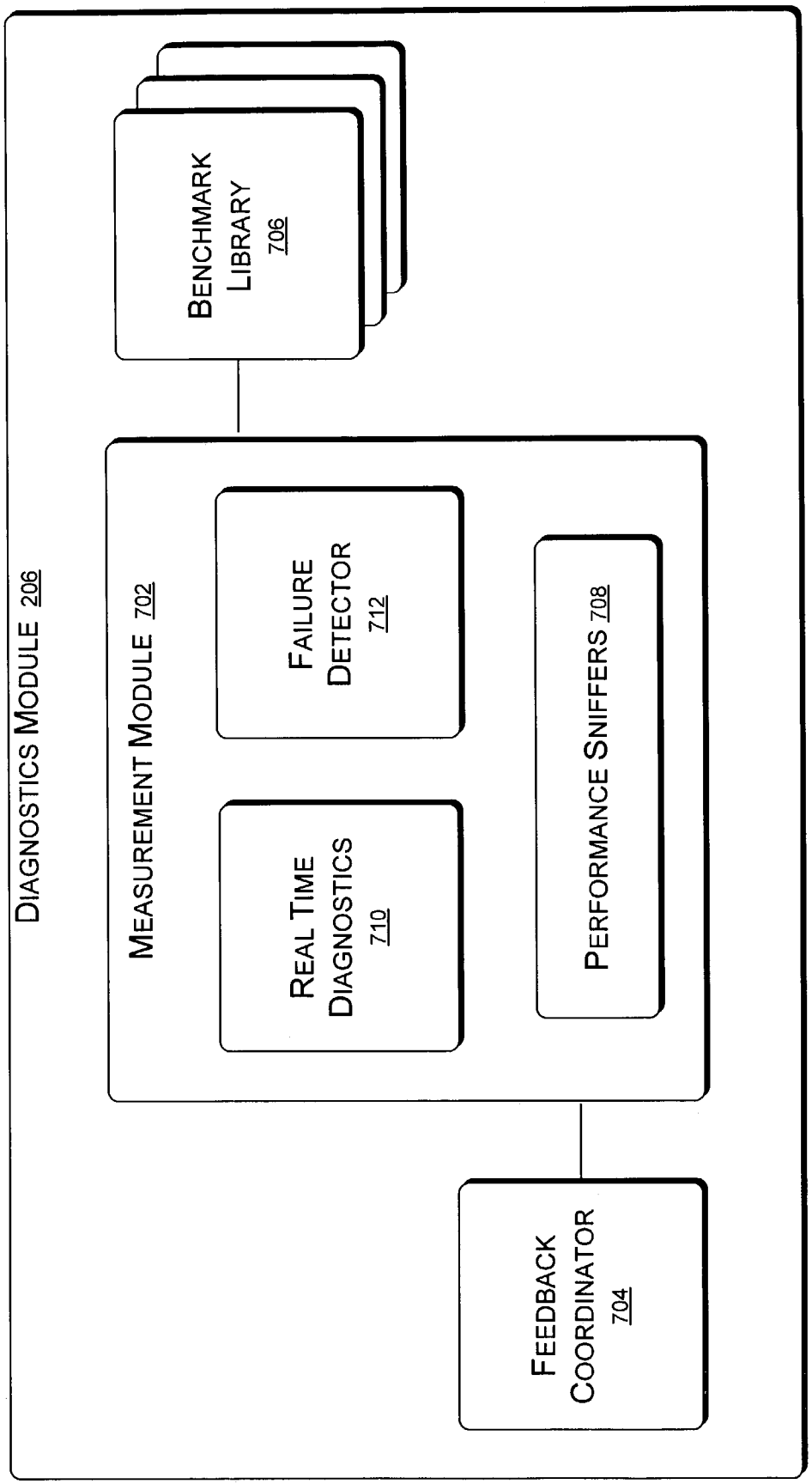
FIG. 7 is a block diagram of an exemplary diagnostics module, according to one aspect of the subject matter.

As shown in FIG. 7, the exemplary NETSIM 104 also includes the aforementioned diagnostics module 206, which includes components to measure electronic device 108, 110, 112 performance during application of network adversity by the executive test engine 216. The measured performance can be used for real-time or summary performance reporting, or as feedback to the progressive testing module 504 for tailoring filter profiles. Accordingly, a measurement module 702, a feedback coordinator 704, and a benchmark library 706 are communicatively coupled as illustrated. The measurement module 702 may include components such as performance "sniffers" 708, a real-time diagnostics module 710, and a failure detector 712. The real-time diagnostics module 710 can perform on-the-fly data traffic analysis based on input from a performance sniffer 708 and send information to the executive test engine 216 via the feedback coordinator 704. The executive test engine 216 in turn may modify a simulation based on the information, which can be sensed again by the performance sniffers 708, in a continuing cycle. The failure detector 712 can point out when an electronic device 108, 110, 112 is not responding properly and/or when a particular network simulation is no longer worth pursuing (e.g., the electronic device 108, 110, 112 is functioning in the face of applied network adversity but nowhere near an expected benchmark).

The benchmark library 706 includes expected levels of performance not only regarding data traffic relative to individual electronic devices 108, 110, 112 but also relative to the many NAT simulations, filter profiles, and connectivity environments possible using the exemplary NETSIM 104. The benchmark library 706 may store an expected level of performance for each parameter in an example filter profile that specifies, for example, upstream bandwidth, downstream bandwidth, number of electronic devices 108, 110, 112 participating in the simulation, styles of NAT, IP addresses, port mapping for each participating electronic device 108, 110, 112, drop rate setting for a selected packet loss simulator 316, packet reordering rate and directionality for the packet sequence controller 320, etc.

Exemplary Evaluation Module

Figure 8:
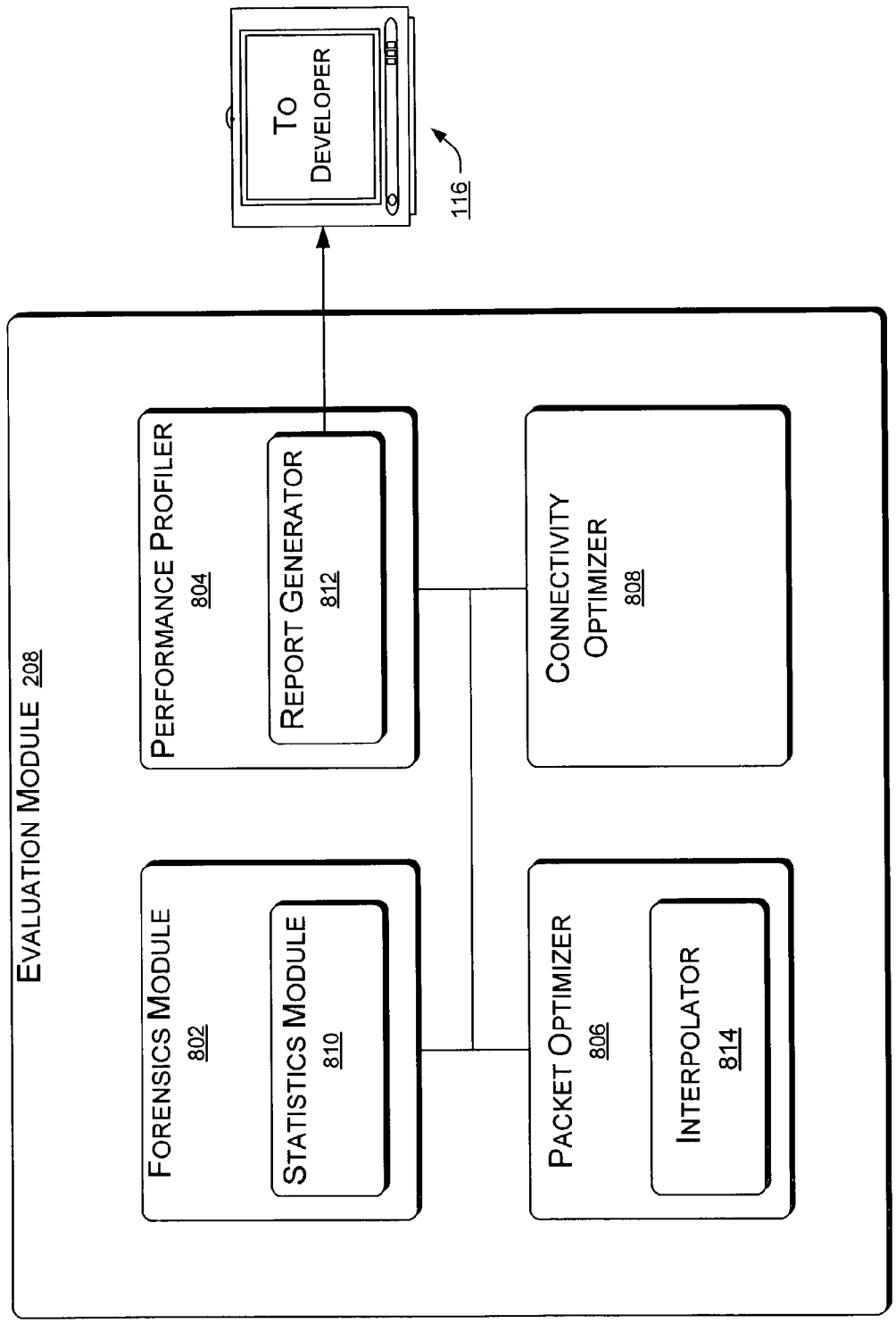
FIG. 8 is a block diagram of an exemplary evaluation module, according to one aspect of the subject matter.

FIG. 8 shows the exemplary evaluation module 208 of FIG. 2 in greater detail. A forensics module 802, a performance profiler 804, a packet optimizer 806, and a connectivity optimizer 808 are communicatively coupled as illustrated. The forensics module 802 may further include a statistics module 810. The performance profiler 804 may further include a report generator 812, and the packet optimizer 806 may further includes an interpolator 814 for performing trial and error simulations to optimal packet size, etc.

The forensics module 802 gathers information from the executive test engine 216 and/or the diagnostics module 206 to determine performance of an electronic device 108, 110, 112 relative to a given simulation. The statistics module 810 gathers statistics about the network traffic of a given piece of software and/or hardware under development, such as the number of bytes sent upstream or downstream by a given electronic device 108, 110, 112. These statistics can be used by the forensics module 802 to troubleshoot connectivity problems and also find out which performance characteristics were satisfactory.

The information gathered by the statistics module 810 can also be used by the connectivity optimizer 808 to determine if the protocol used is the most suitable for the circumstances, and by the packet optimizer 806 to determine if data packaging was performed correctly, for example, making use of padding bytes or not.

The packet optimizer 806 can further use the statistics information to determine if packet payloads are reasonably larger than packet overhead that the net stack applies. Sending small packets upstream or downstream results in exorbitant bandwidth requirements because of overhead added to an unnecessary number of packets. A typical electronic device 108, 110, 112, such as one involved in an online multiplayer game, may operate through a modem that has a speed of 128 kilobytes per second. Each game being played in the online multiplayer setting can require a portion of the available bandwidth, and if the players chat online an additional six to ten kilobytes of the bandwidth are required for each person talking. If the gaming software is sending data to too many ports at once and/or not taking advantage of overhead collapsing, then the bandwidth can be used up very quickly slowing down the gaming action considerably.

In some implementations, the interpolator 814 can send packet optimization information to the packet size module 322 and/or the progressive testing module 504 to adjust packet size or to inform these modules that certain size packets are being used. The interpolator 814 may perform trial and error packet size adjustments or may calculate only a hypothetical optimal packet size if size adjustment of actual packets is not available.

The connectivity optimizer 808 works in conjunction with the connectivity engine 204 to determine optimized connection protocols and/or determines desirable connectivity solutions to report to the developer.

The performance profiler 804 can gather together diagnostic, statistical, and measurement information gathered by the other exemplary NETSIM 104 components and presents these to the developer through the display 116. The performance profiles and other information presented to the developer can be presented in real-time as simulations are being performed or can be summarily presented at the end of a run or stored in log files.

Exemplary Methods

Figure 9:
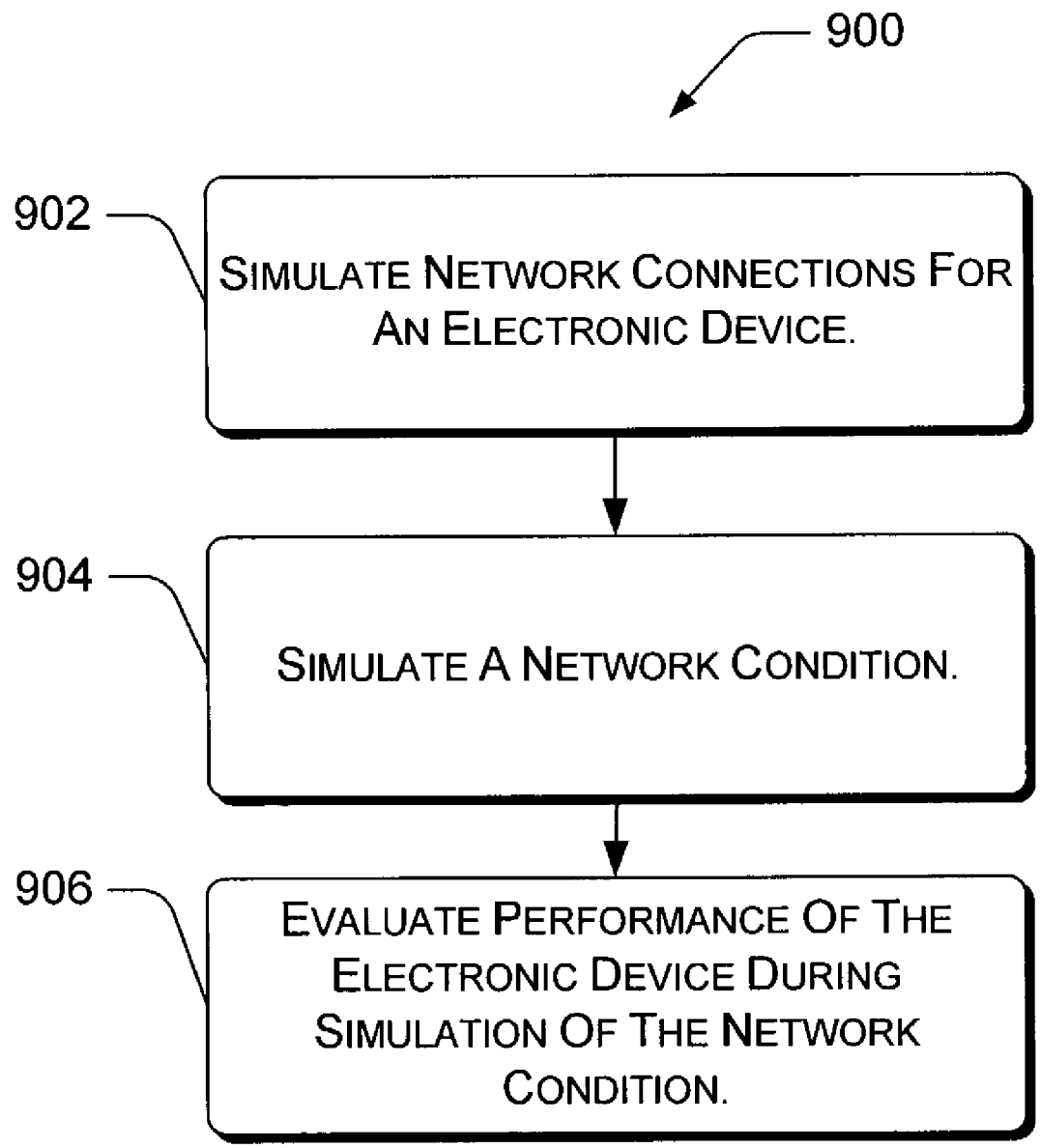
FIG. 9 is a flow diagram of an exemplary method of simulating realistic network conditions for testing network performance of an electronic device.

FIG. 9 shows an exemplary method 900 of simulating realistic network conditions for testing network performance of an electronic device. This exemplary method 900 can be performed by a device, such as the exemplary NETSIM 104 shown in FIGS. 1-8. In the flow diagram, the operations are summarized in individual blocks. The operations may be performed in hardware and/or as machine-readable instructions (software or firmware) that can be executed by a processor.

At block 902, network connections are simulated for coupling an electronic device to a network. Simulated network connections couple electronic devices (having hardware and software) to a network, such as the Internet. Each electronic device may have its own IP address, port mapping, and connectivity protocol. The electronic device sends data to other electronic devices and/or to an Internet service. If the software and/or hardware of the electronic device are under development, then the upstream and downstream data transfers initiated and/or controlled by the electronic device may poorly utilize available bandwidth and network resources.

At block 904, a network condition is flexibly simulated. The simulated network condition may be adverse to data transfer in order to test the ability of the electronic device to successfully and efficiently transfer data.

At block 906, the electronic device is evaluated during the simulated network condition. This evaluation gauges the ability of the electronic device to make efficient use of available network conditions. The evaluation also allows modification of the current network condition simulation(s) and network connectivity simulation(s) or creation of a new test.

Figure 10:
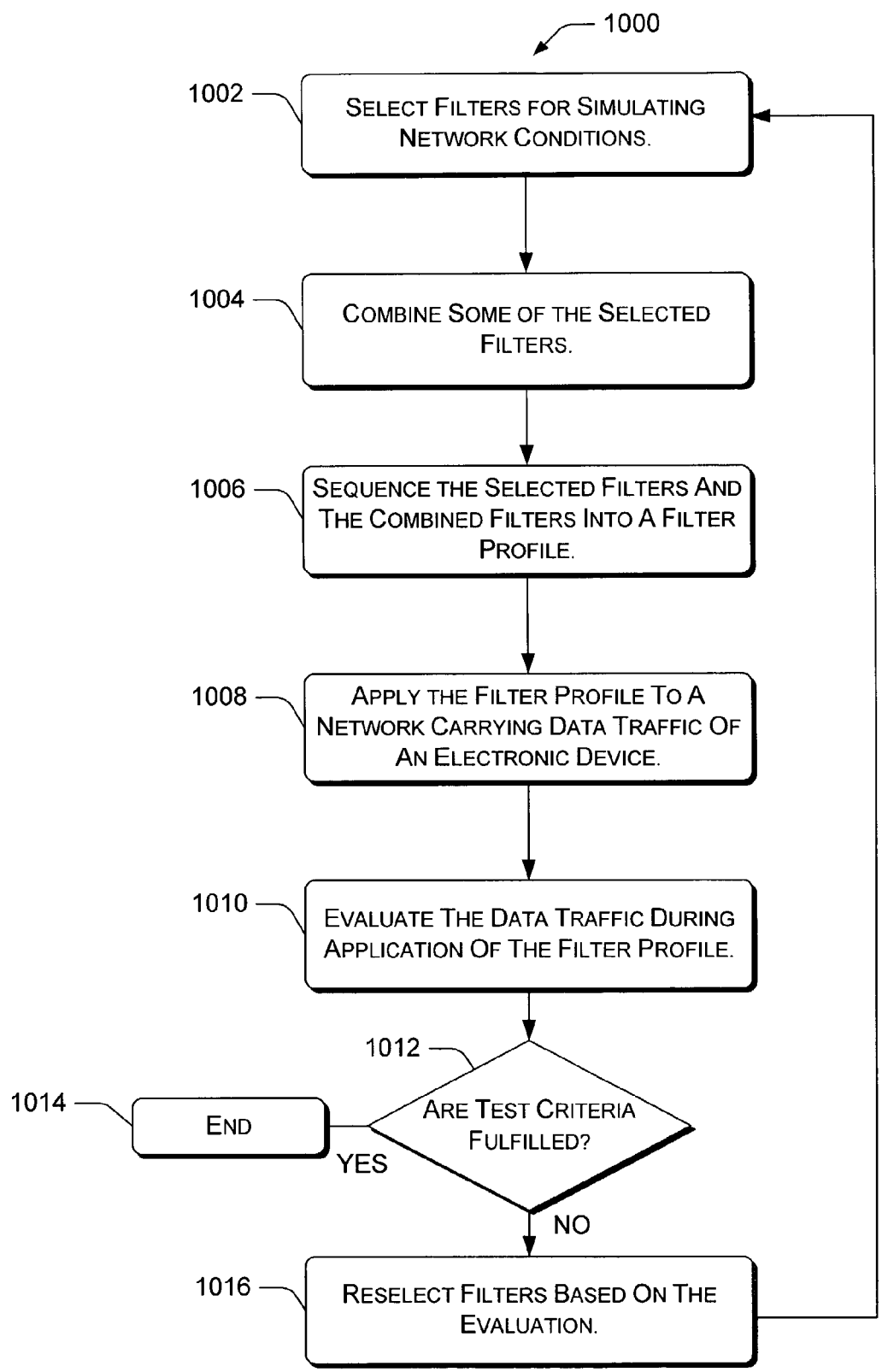
FIG. 10 is a flow diagram of an exemplary method of progressively testing the data transfer performance of an electronic device on a network.

FIG. 10 shows another exemplary method 1000 of progressively testing the data transfer performance of an electronic device on a network. This exemplary method 1000 can be performed by a device, such as the exemplary NETSIM 104 shown in FIGS. 1-8. In the flow diagram, the operations are summarized in individual blocks. The operations may be performed in hardware and/or as machine-readable instructions (software or firmware) that can be executed by a processor.

At block 1002, filters for simulating network conditions are selected.

At block 1004, some of the selected filters are combined.

At block 1006, the selected and the combined filters are sequenced into a filter profile.

At block 1008, the filters in the filter profile are applied to a network carrying data traffic of an electronic device.

At block 1010, the data traffic is evaluated during the application of the filters.

At block 1012, if the test criteria are fulfilled, then the method 1000 branches to block 1014 and ends.

At block 1012, if the test criteria are not fulfilled, then the method 1000 branches to block 1016 and the method 1000 repeats with a reselection of filters based on the evaluation.

Exemplary Computing Device

FIG. 11 shows an exemplary computer 102 suitable as an environment for practicing aspects of the subject matter. The components of computer 102 may include, but are not limited to, a processing unit 1120, a system memory 1130, and a system bus 1121 that couples various system components including the system memory 1130 to the processing unit 1120. The system bus 1121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISAA) bus, Video Electronics Standards Association (VESA) local bus, and Peripheral Component Interconnect (PCI) bus also known as the Mezzanine bus.

Exemplary computer 102 typically includes a variety of computer-readable media. Computer-readable media can be any available media that can be accessed by computer 102 and includes both volatile and nonvolatile media, removable and non-removable media. By way of example, and not limitation, computer-readable media may comprise computer storage media and communication media. Computer storage media include volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 102. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computer readable media.

The system memory 1130 includes computer storage media in the form of volatile and/or nonvolatile memory such as read only memory (ROM) 1131 and random access memory (RAM) 1132. A basic input/output system 1133 (BIOS), containing the basic routines that help to transfer information between elements within computer 102, such as during start-up, is typically stored in ROM 1131. RAM 1132 typically contains data and/or program modules that are immediately accessible to and/or presently being operated on by processing unit 1120. By way of example, and not limitation, FIG. 11 illustrates operating system 1134, application programs 1135, other program modules 1136, and program data 1137. Although the exemplary search engine 204 is depicted as software in random access memory 1132, other implementations of an exemplary search engine 204 can be hardware or combinations of software and hardware.

The exemplary computer 102 may also include other removable/non-removable, volatile/nonvolatile computer storage media. By way of example only, FIG. 11 illustrates a hard disk drive 1141 that reads from or writes to non-removable, nonvolatile magnetic media, a magnetic disk drive 1151 that reads from or writes to a removable, nonvolatile magnetic disk 1152, and an optical disk drive 1155 that reads from or writes to a removable, nonvolatile optical disk 1156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1141 is typically connected to the system bus 1121 through a non-removable memory interface such as interface 1140, and magnetic disk drive 1151 and optical disk drive 1155 are typically connected to the system bus 1121 by a removable memory interface such as interface 1150.

The drives and their associated computer storage media discussed above and illustrated in FIG. 11 provide storage of computer-readable instructions, data structures, program modules, and other data for computer 102. In FIG. 11, for example, hard disk drive 1141 is illustrated as storing operating system 1144, application programs 1145, other program modules 1146, and program data 1147. Note that these components can either be the same as or different from operating system 1134, application programs 1135, other program modules 1136, and program data 1137. Operating system 1144, application programs 1145, other program modules 1146, and program data 1147 are given different numbers here to illustrate that, at a minimum, they are different copies. A user may enter commands and information into the exemplary computer 102 through input devices such as a keyboard 114 and pointing device 1161, commonly referred to as a mouse, trackball, or touch pad. Other input devices (not shown) may include a microphone, joystick, game pad, satellite dish, scanner, or the like. These and other input devices are often connected to the processing unit 1120 through a user input interface 1160 that is coupled to the system bus, but may be connected by other interface and bus structures, such as a parallel port, game port, or a universal serial bus (USB). A monitor 116 or other type of display device is also connected to the system bus 1121 via an interface, such as a video interface 1190. In addition to the monitor 116, computers may also include other peripheral output devices such as speakers 1197 and printer 1196, which may be connected through an output peripheral interface 1195.

The exemplary computer 102 may operate in a networked environment using logical connections to one or more remote computers, such as a remote computer 1180. The remote computer 1180 may be a personal computer, a server, a router, a network PC, a peer device or other common network node, and typically includes many or all of the elements described above relative to computer 102, although only a memory storage device 1181 has been illustrated in FIG. 11. The logical connections depicted in FIG. 11 include a local area network (LAN) 1171 and a wide area network (WAN) 1173, but may also include other networks. Such networking environments are commonplace in offices, enterprise-wide computer networks, intranets, and the Internet 106.

When used in a LAN networking environment, the exemplary computer 102 is connected to the LAN 1171 through a network interface or adapter 1170. When used in a WAN networking environment, the exemplary computer 102 typically includes a modem 1172 or other means for establishing communications over the WAN 1173, such as the Internet. The modem 1172, which may be internal or external, may be connected to the system bus 1121 via the user input interface 1160, or other appropriate mechanism. In a networked environment, program modules depicted relative to the exemplary computer 102, or portions thereof, may be stored in the remote memory storage device. By way of example, and not limitation, FIG. 11 illustrates remote application programs 1185 as residing on memory device 1181. It will be appreciated that the network connections shown are exemplary and other means of establishing a communications link between the computers may be used.

Conclusion

The foregoing describes exemplary network simulation tools and related methods for flexibly simulating connectivity between electronic devices and their Internet services and testing their network performance during realistic real-time network conditions. The subject matter described above can be implemented in hardware, in software, or in both hardware and software. In certain implementations, the exemplary NETSIM and related methods may be described in the general context of computer-executable instructions, such as program modules, being executed by a computer. Generally, program modules include routines, programs, objects, components, data structures, etc. that perform particular tasks or implement particular abstract data types. The subject matter can also be practiced in distributed communications environments where tasks are performed over wireless communication by remote processing devices that are linked through a communications network. In a wireless network, program modules may be located in both local and remote communications device storage media including memory storage devices.

The invention claimed is:

1. An apparatus, comprising:
   a processing unit; and
   a system memory coupled to the processing unit, the system memory storing engines operable by the processing unit, the engines comprising:
      a simulation engine to produce network conditions for testing performance of gaming software on a gaming network, wherein the simulation engine generates a filter profile, the filter profile including multiple simulation filters that have been selected, combined and sequenced in order to produce a customized profile for testing performance of the network conditions;

an executive test engine, the executive test engine comprising:
a timer; and
a progressive testing module that uses feedback to alter the progression, sequence, and combination of the simulation filters in the filter profile, the altering done in response to changing adverse network connectivity conditions, wherein the progressive testing module:
proceeds logically from easy testing, in which network adversity conditions presented by the filter profile are light, to rigorous testing, in which the network adversity conditions presented by the filter profile are more difficult; and
has access to the timer as a reference for measuring performance and measuring the duration of a progressive simulation being applied; and
a connectivity engine to establish the configuration of the gaming network, including simultaneously establishing multiple different network connectivity simulations between external devices connected to the apparatus,
wherein at least one of the simulation filters is selected from a plurality of simulations filters, the plurality of simulation filters comprising:
an upstream bandwidth controller;
a downstream bandwidth controller;
a data transfer latency simulator;
a packet loss simulator;
a data packet burst simulator;
a packet sequence controller; and
a jitter simulator.

2. The apparatus as recited in claim 1, further comprising a configuration module in the simulation engine to arrange the multiple simulation filters into the filter profile.

3. The apparatus as recited in claim 2, wherein the configuration module arranges an upstream filter profile and a downstream filter profile.

4. The apparatus as recited in claim 2, wherein the executive test engine applies the multiple simulation filters to a data transfer according to the filter profile.

5. The apparatus as recited in claim 1, wherein the connectivity engine further comprises an electronic device interface and an Internet interface.

6. The apparatus as recited in claim 1, wherein the connectivity engine includes a virtual network interface driver to simulate multiple network interface cards on a single physical network interface card.

7. The apparatus as recited in claim 1, wherein the connectivity engine uses two or more network interface cards without a virtual local area network.

8. The apparatus as recited in claim 1, wherein the connectivity engine includes a port mapper.

9. The apparatus as recited in claim 1, wherein the connectivity engine further comprises a protocol adapter to establish a communications protocol for transferring data on the Internet.

10. The apparatus as recited in claim 1, wherein the connectivity engine further comprises a network address translation module to simulate a network address translation style or configuration.

11. The apparatus as recited in claim 1, wherein the connectivity engine further comprises a peer-to-peer module to simulate a gaming network connection between multiple gaming peers.

12. The apparatus as recited in claim 1, wherein the connectivity engine further comprises a multiplayer module to simulate data traffic between multiple online gaming peers and one or more Internet services.

13. The apparatus as recited in claim 1, wherein the connectivity engine further comprises a domain name service redirector.

14. The apparatus as recited in claim 1, wherein the connectivity engine further comprises a dynamic host configuration protocol (DHCP) manager.

15. The apparatus as recited in claim 1, wherein the connectivity engine further comprises an evaluation module to send performance results to a user or developer.

16. The apparatus as recited in claim 15, wherein the evaluation module further comprises a forensics module to evaluate a data transfer response to simulation filters applied by an executive test engine.

17. The apparatus as recited in claim 16, wherein the forensics module further comprises a statistics module to gather statistics about data transfer performance.

18. The apparatus as recited in claim 1, wherein the apparatus changes a ratio comprising packet overhead divided by packet payload in order to improve performance of the gaming software being tested by the simulation engine and the connectivity engine.

19. The apparatus as recited in claim 18, wherein the apparatus changes a packet size.

20. A development environment for online gaming software, comprising:
a processing unit; and
a system memory coupled to the processing unit, the system memory storing simulators operable by the processing unit, the simulators comprising:
a network adversity simulator, wherein the network adversity simulator comprises:
a filter module, the filter module including multiple single network simulation filters that are selected, sequenced and combined to provide flexibility in creating multiple different filter profiles for testing network conditions;
a configuration module, the configuration module accepting guidance from either a user or a library of template profiles, in order to create the multiple different filter profiles which each include at least one single network simulation filter; and
an executive test engine, the executive test engine comprising:
a timer; and
a progressive testing module that uses feedback to alter the progression, sequence, and combination of single network simulation filters in a filter profile, the altering done in response to changing adverse network connectivity conditions, wherein the progressive testing module:
proceeds logically from easy testing, in which network adversity conditions presented by a filter are light, to rigorous testing, in which the network adversity conditions presented by a filter are more difficult; and
has access to the timer as a reference for measuring performance and measuring the duration of a progressive simulation being applied;
a network connectivity simulator to create multiple simultaneous adverse network connectivity simulations between external devices running the gaming software,
wherein at least one of the network simulation filters is selected from a plurality of network simulations filters, the plurality of network simulation filters comprising:
an upstream bandwidth controller;
a downstream bandwidth controller;
a data transfer latency simulator that emulates delays in packet delivery due to Internet complexities;

a packet loss simulator that drops a percentage of packet traffic;
a data packet burst simulator that drops a certain percentage of packets in a given amount of time;
a packet sequence controller that reorders packets to simulate out-of-order packets due to disparate Internet routing; and
a jitter simulator that holds a plurality of packets and sends the plurality of packets together.

21. The development environment as recited in claim 20, wherein the network adversity simulator builds a rearrangeable set of network conditions that simulate adverse data transfer conditions during an online gaming session.

22. The development environment as recited in claim 21, wherein the network connectivity simulator establishes a rearrangeable set of network connections and network protocols for applying the rearrangeable set of network conditions to a data transfer.

23. The development environment as recited in claim 20, further comprising a software performance evaluator to report gaming data transfer parameters relative to network conditions simulated by the network adversity simulator, to network connections, and to network protocols simulated by the network connectivity simulator.

24. A network adversity simulator, comprising:
one or more computer-readable media storing instructions that are executed by a processor, the computer-readable media comprising:
a connectivity engine to create multiple simultaneous network connectivity simulations between external devices connected to the network adversity simulator;
multiple network condition filters;
a configuration module that creates different filter profiles, the different profiles each comprising a different set of multiple network condition filters; and
an executive test engine that implements at least one of the multiple different filter profiles, wherein the executive test engine comprises:
a timer; and
a progressive testing module that uses feedback to alter the progression, sequence, and combination of the multiple network condition filters in the filter profile, the altering done in response to changing adverse network connectivity conditions, wherein the progressive testing module:
proceeds logically from easy testing, in which network adversity conditions presented by the filter profile are light, to rigorous testing, in which the network adversity conditions presented by the filter profile are more difficult; and
has access to the timer as a reference for measuring performance and measuring the duration of a progressive simulation being applied;
wherein one of the multiple network condition filters is selected from a plurality of network condition filters, the plurality of network condition filters comprising:
an upstream bandwidth controller;
a downstream bandwidth controller;
a data transfer latency simulator;
a packet loss simulator;
a data packet burst simulator;
a packet sequence controller; and
a jitter simulator.

25. The network adversity simulator as recited in claim 23, wherein a configuration module creates a filter profile for each of an upstream data flow and a downstream data flow from an electronic device.

26. The network adversity simulator as recited in claim 25, wherein the electronic device runs gaming software that controls data transfer to and from the electronic device.

27. A system, comprising:
multiple electronic devices communicatively coupled to each other and to an Internet service, wherein at least one of the electronic devices includes a processor that executes gaming software under development, the gaming software controlling data flow to and from the at least one electronic device;
a network simulator for applying adverse network conditions to data transfers between multiple external electronic devices or between an external electronic device and the Internet service using multiple simulation filters that have been selected, combined and sequenced in order to produce a customized filter profile for testing the performance of the adverse network conditions, wherein the customized filter profile is altered in response to feedback received from progressively varying the intensity and the duration of the adverse network conditions; and
a connectivity simulator to modify network connections and network protocols for improving data transfer performance between the multiple external electronic devices or between an external electronic device and the Internet service,
wherein at least one of the multiple simulation filters is selected from a plurality of simulation filters, the plurality of simulation filters comprising:
an upstream bandwidth controller;
a downstream bandwidth controller;
a data transfer latency simulator;
a packet loss simulator;
a data packet burst simulator;
a packet sequence controller; and
a jitter simulator.

28. The system as recited in claim 27, wherein the connectivity simulator establishes a style of network address translation protocol.

29. The system as recited in claim 27, further comprising a display for sending a user or software developer information about the data transfer performance of the software for a given set of network connections, network protocols, and adverse network conditions.

30. A method of progressively testing data transfer performance of an electronic device on a network, the method comprising:
selecting a first set of a plurality of filters for simulating network conditions;
combining the selected filters;
sequencing the combined selected filters into a customized filter profile;
applying the customized filter profile to a network carrying data traffic of an electronic device;
evaluating the data traffic during application of the customized filter profile; and
determining when one or more of a plurality of test criterion are fulfilled, the test criterion defining an achieved performance level for the simulated network conditions:
in an event the test criterion are fulfilled, ending the simulation of network conditions;
in an event the test criterion are not fulfilled, reselecting a different set of a plurality of filters based on the evaluating and continuing the simulation of network conditions using the different set of a plurality of filters, wherein the different set of a plurality of filters are progressively more rigorous than the first set of a plurality of filters.

* * * * *